(12) United States Patent
Huang

(10) Patent No.: US 6,394,923 B1
(45) Date of Patent: May 28, 2002

(54) DRIVE CHAIN

(75) Inventor: E-Cheng Huang, Pingtung (TW)

(73) Assignee: Ming Chang Traffic Manufacturing Co., Ltd., Pingtung City (TW)

( * ) Notice: Subject to any disclaimer, the term of this patent is extended or adjusted under 35 U.S.C. 154(b) by 0 days.

(21) Appl. No.: 09/610,184

(22) Filed: Jul. 5, 2000

(51) Int. Cl.⁷ ............................................. F16G 13/02
(52) U.S. Cl. ..................... 474/231; 474/228; 474/230
(58) Field of Search ........................... 474/219, 228, 474/229, 230, 231, 234

(56) References Cited

U.S. PATENT DOCUMENTS

| | | | | |
|---|---|---|---|---|
| 3,948,574 A | * | 4/1976 | Baylor | 305/58 PC |
| 4,094,515 A | * | 6/1978 | Araya et al. | 277/92 |
| 4,464,151 A | * | 8/1984 | Kahl | 474/231 |
| 4,494,945 A | * | 1/1985 | Ogino | 474/231 |
| 4,575,914 A | * | 3/1986 | Armida et al. | 29/434 |
| 4,729,754 A | * | 3/1988 | Thuerman | 474/207 |
| 4,978,327 A | * | 12/1990 | Wu | 474/228 |
| 4,983,147 A | * | 1/1991 | Wu | 474/206 |
| 5,151,066 A | * | 9/1992 | Wu | 474/206 |
| 5,186,569 A | * | 2/1993 | Wu | 403/154 |
| 5,322,483 A | * | 6/1994 | Wang | 474/206 |
| 5,465,568 A | * | 11/1995 | Wang | 59/4 |
| 5,921,880 A | * | 7/1999 | Ishimoto et al. | 474/207 |

* cited by examiner

Primary Examiner—Thomas R. Hannon
Assistant Examiner—Vicky A. Johnson
(74) Attorney, Agent, or Firm—Merchant & Gould P.C.

(57) ABSTRACT

A drive chain includes outer and inner chain plates, rollers, and pins. The outer and inner chain plates employ a closed-type pivot engagement therebetween so as to enhance protection against dust, to avoid undesired release of lubricant, and to avoid concentration of shearing forces on the pins in order to improve durability of the drive chain.

2 Claims, 4 Drawing Sheets

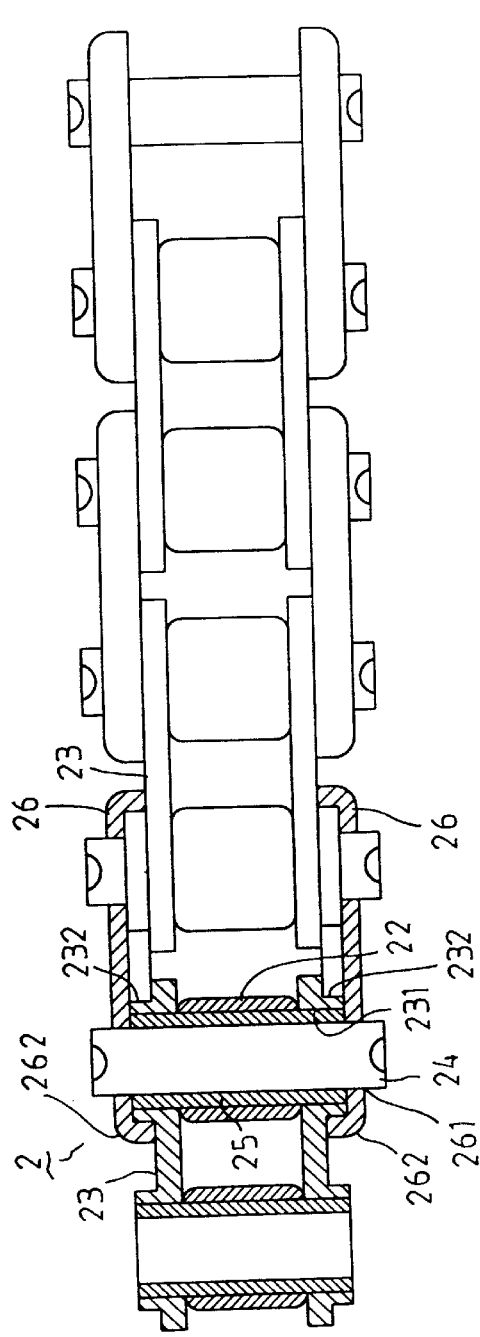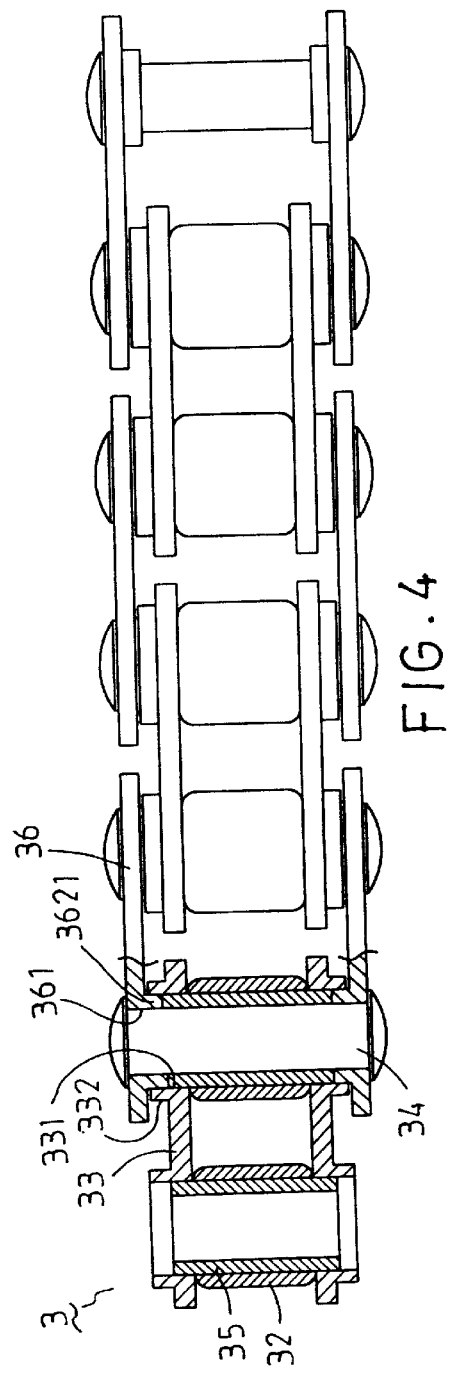

DRIVE CHAIN

BACKGROUND OF THE INVENTION

1. Field of the Invention

The invention relates to a drive chain, more particularly to a drive chain having a durable construction and enhanced protection against dust.

2. Description of the Related Art

Referring to FIG. 1, a conventional drive chain 1 is shown to include a plurality of parallel pairs of outer chain plates 16, a plurality of parallel pairs of inner chain plates 13, a plurality of parallel pairs of tubular rollers 12, a plurality of pins 14 and a plurality of bushings 15. Each of the outer-chain plates 16 is formed with a pair of first pin holes 161. Each of the inner chain plates 13 is formed with a pair of second pin holes 131. Each of the pairs of the inner chain plates 13 is disposed between two adjacent pairs of the outer chain plates 16 such that one of the second pin holes 131 in each of the inner chain plates 13 is aligned with the first pin holes 161 in one of the adjacent pairs of the outer chain plates 16, and such that the other one of the second pin holes 131 is aligned with the first pin holes 161 in the other one of the adjacent pairs of the outer chain plates 16. Each of the pairs of rollers 12 is disposed between a corresponding one of the pairs of the inner chain plates 13 such that the rollers 12 in each of the pairs are aligned respectively in an axial direction with the second pin holes 131 in the corresponding one of the pairs of the inner chain plates 13. Each of the pins 14 extends axially through a respective one of the rollers 12 and through aligned ones of the first and second pin holes 161,131. Each of the bushings 15 is sleeved on a respective one of the pins 14 and has a respective one of the rollers 12 sleeved thereon. Each of the bushings 15 has opposite ends that abut against one of the pairs of the inner chain plates 13, respectively.

Some of the drawbacks of the aforesaid conventional drive chain 1 are as follows:

1. Most of the components of the drive chain 1 are made of metal to result in a strong construction. As such, lubricant is needed to ensure smooth pivoting movement among the components of the drive chain 1. However, since the pivot joints among the inner and outer chain plates 13, 16 and the pins 14 of the drive chain 1 are exposed, dust can easily get trapped and collect on the lubricant present in clearances that are formed by the pivot joints. In addition, the lubricant can be undesirably released via the aforesaid clearances when the drive chain 1 is in use. As such, the operation of the drive chain 1 is adversely affected, and the service life of the same is accordingly reduced.

2. When the drive chain 1 is in use, two opposite pulling forces are applied by the inner and outer chain plates 13, 16 on the pins 14. The resulting shearing force can cause damage to the pins 14.

SUMMARY OF THE INVENTION

Therefore, the object of the present invention is to provide a drive chain that is capable of overcoming the aforesaid drawbacks commonly associated with the prior art.

According to the present invention, a drive chain comprises:

a plurality of parallel pairs of outer chain plates, each of the outer chain plates being formed with a pair of first pin holes;

a plurality of parallel pairs of inner chain plates, each of the inner chain plates being formed with a pair of second pin holes, each of the pairs of the inner chain plates being disposed between two adjacent pairs of the outer chain plates such that one of the second pin holes in each of the inner chain plates is aligned with the first pin holes in one of the adjacent pairs of the outer chain plates, and such that the other one of the second pin holes in each of the inner chain plates is aligned with the first pin holes in the other one of the adjacent pairs of the outer chain plates;

a plurality of parallel pairs of tubular rollers, each of the pairs of the rollers being disposed between a corresponding one of the pairs of the inner chain plates such that the rollers in each of the pairs are aligned respectively in an axial direction with the second pin holes in the corresponding one of the pairs of the inner chain plates; and a plurality of pins, each of which extends axially through a respective one of the rollers and through aligned ones of the first and second pin holes.

In one embodiment, each of the inner chain plates is formed with a pair of annular rims that are disposed respectively around the second pin holes and that extend in the axial direction away from the rollers so as to abut against two adjacent ones of the outer chain plates. Each of the outer chain plates is formed with a peripheral flange that extends in the axial direction toward the rollers so as to abut against two adjacent ones of the inner chain plates and that retains pivotally one of the annular rims on each of the two adjacent ones of the inner chain plates.

In another embodiment, each of the inner chain plates is formed with a pair of outer annular rims that are disposed respectively around the second pin holes and that extend in the axial direction away from the rollers so as to abut against two adjacent ones of the outer chain plates. Each of the outer chain plates is formed with a pair of inner annular rims that are disposed respectively around the first pin holes and that extend in the axial direction toward the rollers and into a respective one of the outer annular rims.

In a further embodiment, each of the outer chain plates is formed with a pair of first annular rims that are disposed respectively around the first pin holes and that extend in the axial direction toward the rollers and into a respective one of the second pin holes. Each of the inner chain plates is formed with a pair of second annular rims that are disposed respectively around the second pin holes and that extend in the axial direction toward the rollers so as to abut against the corresponding one of the pairs of the rollers.

BRIEF DESCRIPTION OF THE DRAWINGS

Other features and advantages of the present invention will become apparent in the following detailed description of the preferred embodiments with reference to the accompanying drawings, of which:

FIG. 3 is a fragmentary partly cross-sectional view of the first preferred embodiment;

FIG. 4 is a fragmentary partly cross-sectional view of the second preferred embodiment of a drive chain according to the present invention;

DETAILED DESCRIPTION OF THE PREFERRED EMBODIMENTS

Figure 1:
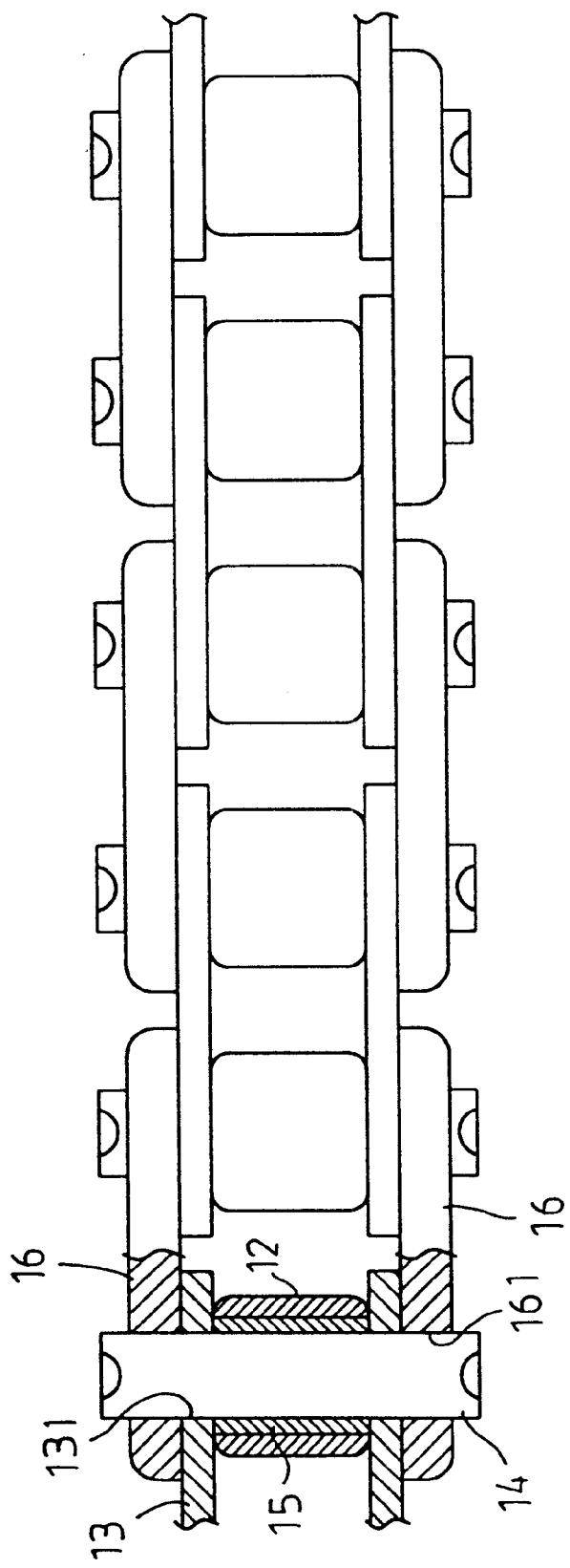
FIG. 1 is a fragmentary partly cross-sectional view of conventional drive chain.
Figure 2:
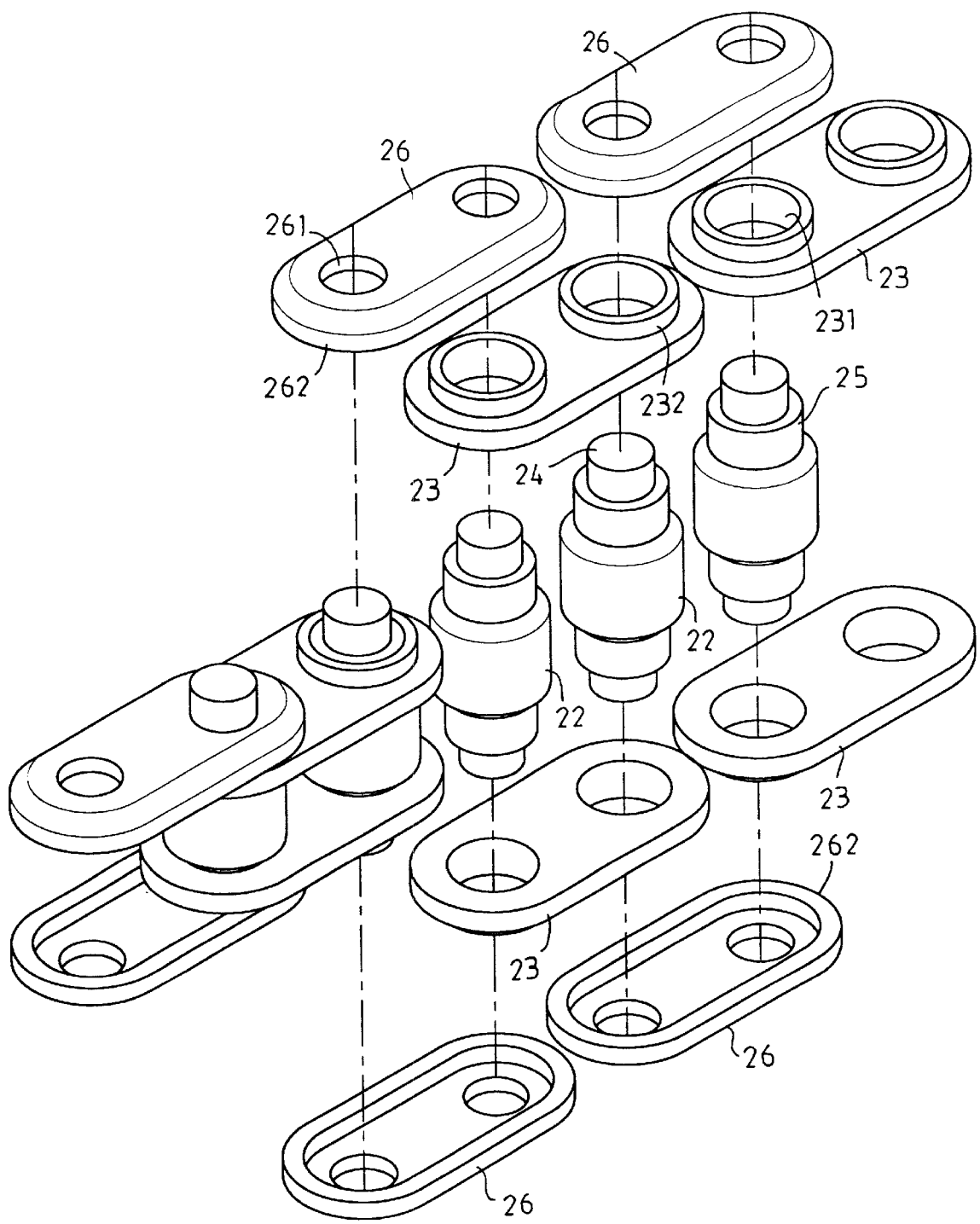
FIG. 2 is a fragmentary exploded perspective view of the first preferred embodiment of a drive chain according to the present invention.

Referring to FIGS. 2 and 3, the first preferred embodiment of a drive chain 2 according to the present invention is shown to include a plurality of parallel pairs of outer chain plates 26, a plurality of parallel pairs of inner chain plates 23, a plurality of parallel pairs of tubular rollers 22, a plurality of pins 24, and a plurality of bushings 25. Each of the outer chain plates 26 is formed with a pair of first pin holes 261. Each of the inner chain plates 23 is formed with a pair of second pin holes 231. Each of the pairs of the inner chain plates 23 is disposed between two adjacent pairs of the outer chain plates 26 such that one of the second pin holes 231 in each of the inner chain plates 23 is aligned with the first pin holes 261 in one of the adjacent pairs of the outer chain plates 26, and such that the other one of the second pin holes 231 in each of the inner chain plates 23 is aligned with the first pin holes 261 in the other one of the adjacent pairs of the outer chain plates 26. Each of the pairs of the rollers 22 is disposed between a corresponding one of the pairs of the inner chain plates 23 such that the rollers 22 in each of the pairs are aligned respectively in an axial direction with the second pin holes 231 in the corresponding one of the pairs of the inner chain plates 23. Each of the pins 24 extends axially through a respective one of the rollers 22 and through aligned ones of the first and second pin holes 261, 231.

Each of the inner chain plates 23 is formed with a pair of annular rims 232 that are disposed respectively around the second pin holes 231 and that extend in the axial direction away from the rollers 22 so as to abut against two adjacent ones of the outer chain plates 26. Each of the outer chain plates 26 is formed with a peripheral flange 262 that extends in the axial direction toward the rollers 22 so as to abut against two adjacent ones of the inner chain plates 23 and that retains pivotally one of the annular rims 232 on each of the two adjacent ones of the inner chain plates 23. Each of the bushings 25 is sleeved on a respective one of the pins 24 and has a respective one of the rollers 22 sleeved thereon. Each of the bushings 25 has opposite ends that abut against one of the pairs of the outer chain plates 26, respectively.

Referring to FIG. 4, the second preferred embodiment of a drive chain 3 according to the present invention is shown to include a plurality of parallel pairs of outer chain plates 36, a plurality of parallel pairs of inner chain plates 33, a plurality of parallel pairs of tubular rollers 32, a plurality of pins 34, and a plurality of bushings 35. Each of the outer chain plates 36 is formed with a pair of first pin holes 361. Each of the inner chain plates 33 is formed with a pair of second pin holes 331. Each of the pairs of the inner chain plates 33 is disposed between two adjacent pairs of the outer chain plates 36 such that one of the second pin holes 331 in each of the inner chain plates 33 is aligned with the first pin holes 361 in one of the adjacent pairs of the outer chain plates 36, and such that the other one of the second pin holes 331 in each of the inner chain plates 33 is aligned with the first pin holes 361 in the other one of the adjacent pairs of the outer chain plates 36. Each of the pairs of the rollers 32 is disposed between a corresponding one of the pairs of the inner chain plates 33 such that the rollers 32 in each of the pairs are aligned respectively in an axial direction with the second pin holes 331 in the corresponding one of the pairs of the inner chain plates 33. Each of the pins 34 extends axially through a respective one of the rollers 32 and through aligned ones of the first and second pin holes 361,331.

Each of the inner chain plates 33 is formed with a pair of outer annular rims 332 that are disposed respectively around the second pin holes 331 and that extend in the axial direction away from the rollers 32 so as to abut against two adjacent ones of the outer chain plates 36. Each of the outer chain plates 36 is formed with a pair of inner annular rims 3621 that are disposed respectively around the first pin holes 361 and that extend in the axial direction toward the rollers 32 and into a respective one of the outer annular rims 332. Each of the bushings 35 is sleeved on a respective one of the pins 34 and has a respective one of the rollers 32 sleeved thereon. Each of the bushings 35 has opposite ends that abut against the inner annular rims 3621 of a corresponding pair of the outer chain plates 36, respectively.

Figure 5:
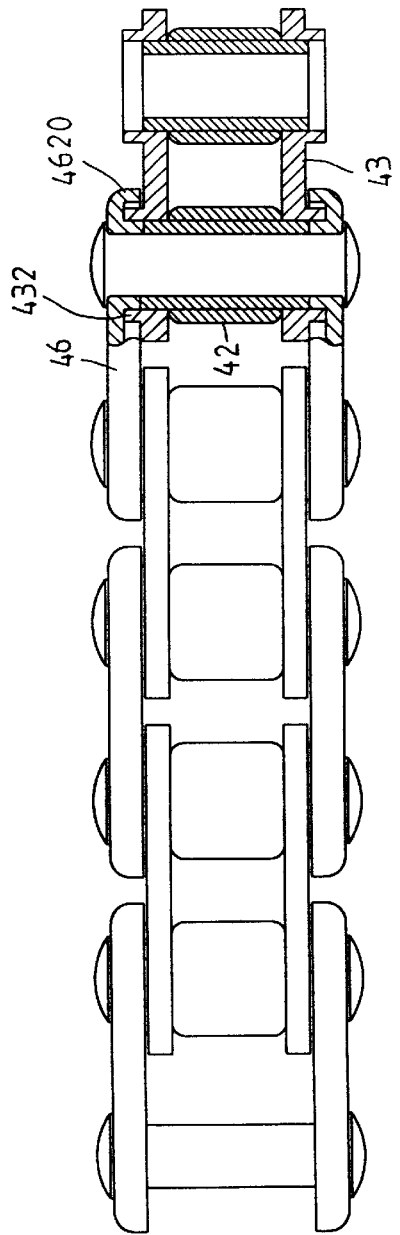
FIG. 5 is a fragmentary partly cross-sectional view of the third preferred embodiment of a drive chain according to the present invention.

Referring to the FIG. 5, the third preferred embodiment of a drive chain 4 according to the present invention is shown to be similar to the second preferred embodiment, except that each of the outer chain plates 46 is further formed with a peripheral flange 4620 that extends in the axial direction toward the rollers 42 so as to surround one of the annular rims 432 on each of two adjacent ones of the inner chain plates 43.

Figure 6:
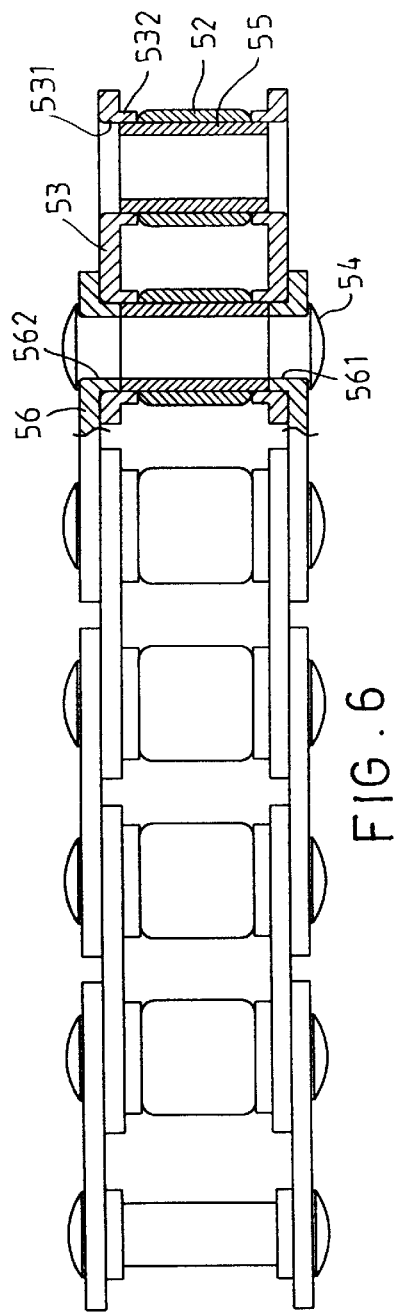
FIG. 6 is a fragmentary partly cross-sectional view of the fourth preferred embodiment of a drive chain according to the present invention.

Referring to the FIG. 6, the fourth preferred embodiment of a drive chain 5 according to the present invention is shown to include a plurality of parallel pairs of outer chain plates 56, a plurality of parallel pairs of inner chain plates 53, a plurality of parallel pairs of tubular rollers 52, a plurality of pins 54, and a plurality of bushings 55. Each of the outer chain plates 56 is formed with a pair of first pin holes 561. Each of the inner chain plates 53 is formed with a pair of second pin holes 531. Each of the pairs of the inner chain plates 53 is disposed between two adjacent pairs of the outer chain plates 56 such that one of the second pin holes 531 in each of the inner chain plates 53 is aligned with the first pin holes 561 in one of the adjacent pairs of the outer chain plates 56, and such that the other one of the second pin holes 531 in each of the inner chain plates 53 is aligned with the first pin holes 561 in the other one of the adjacent pairs of the outer chain plates 56. Each of the pairs of the rollers 52 is disposed between a corresponding one of the pairs of the inner chain plates 53 such that the rollers 52 in each of the pairs are aligned respectively in an axial direction with the second pin holes 531 in the corresponding one of the pairs of the inner chain plates 53. Each of the pins 54 extends axially through a respective one of the rollers 52 and through aligned ones of the first and second pin holes 561, 531.

Each of the outer chain plates 56 is formed with a pair of first annular rims 562 that are disposed respectively around the first pin holes 561 and that extend in the axial direction toward the rollers 52 and into a respective one of the second pin holes 531. Each of the inner chain plates 53 is formed with a pair of second annular rims 532 that are disposed respectively around the second pin holes 531 and that extend in the axial direction toward the rollers 52 so as to abut against the corresponding one of the pairs of the rollers 52. Each of the bushings 55 is sleeved on a respective one of the pins 54 and has a respective one of the rollers 52 sleeved thereon. Each of the bushings 55 has opposite ends that abut against the first annular rims 562 of a corresponding pair of the outer chain plates 56, respectively.

In the aforesaid embodiments of this invention, the outer and inner chain plates employ a closed-type pivot engagement therebetween so as to enhance protection against dust, to avoid undesired release of lubricant, and to avoid concentration of shearing forces on the pins in order to improve durability of the drive chain.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A drive chain comprising:

a plurality of parallel pairs of outer chain plates, each of said outer chain plates being formed with a pair of first pin holes;

a plurality of parallel pairs of inner chain plates, each of said inner chain plates being formed with a pair of second pin holes, each of said pairs of said inner chain plates being disposed between two adjacent pairs of said outer chain plates such that one of said second pin holes in each of said inner chain plates is aligned with said first pin holes in one of the adjacent pairs of said outer chain plates, and such that the other one of said second pin holes in each of said inner chain plates is aligned with said first pin holes in the other one of the adjacent pairs of said outer chain plates;

a plurality of parallel pairs of tubular rollers, each of said pairs of said rollers being disposed between a corresponding one of said pairs of said inner chain plates such that said rollers in each of said pairs are aligned respectively in an axial direction with said second pin holes in the corresponding one of said pairs of said inner chain plates; and a plurality of pins, each of which extends axially through a respective one of said rollers and through aligned ones of said first and second pin holes;

each of said inner chain plates being formed with a pair of annular rims that are disposed respectively around said second pin holes and that extend in the axial direction away from said rollers so as to abut against two adjacent ones of said outer chain plates;

each of said outer chain plates being formed with a continuous peripheral flange that extends in the axial direction toward said rollers so as to abut against two adjacent ones of said inner chain plates and that forms a receiving space for confining pivotally one of said annular rims on each of said two adjacent ones of said inner chain plates.

2. The drive chain of claim 1, further comprising a plurality of bushings, each of which is sleeved on a respective one of said pins and has a respective one of said rollers sleeved thereon, each of said bushings having opposite ends that abut against one of said pairs of said outer chain plates, respectively.

* * * * *